United States Patent [19]

Ozdemir

[11] Patent Number: 4,651,901
[45] Date of Patent: Mar. 24, 1987

[54] DEVICE FOR SECURING A DOSING APPARATUS ON A BOTTLE

[76] Inventor: Nazmi Ozdemir, 25 belogade 3 tv., 2100 Copenhagen O, Denmark

[21] Appl. No.: 636,604

[22] Filed: Aug. 1, 1984

[30] Foreign Application Priority Data

Aug. 3, 1983 [DK] Denmark .................... 3540/83

[51] Int. Cl.⁴ ........................................... B65D 47/06
[52] U.S. Cl. .................................. 222/153; 222/567; 215/284; 285/312; 292/247
[58] Field of Search .............. 222/153, 567; 215/278, 215/284, 293, 273; 285/312, 313, 310, 311, 320; 292/247, 257

[56] References Cited

U.S. PATENT DOCUMENTS

| | | | |
|---|---|---|---|
| 387,536 | 8/1886 | Parrish | 292/247 |
| 783,256 | 2/1905 | Foote | 215/278 |
| 1,756,279 | 4/1930 | Campbell | 215/284 X |
| 2,566,669 | 9/1951 | Lesnick | 222/153 |
| 2,764,315 | 9/1956 | Haecker | 222/153 X |
| 4,214,728 | 7/1980 | Fleischer | 285/20 X |

FOREIGN PATENT DOCUMENTS

| | | | |
|---|---|---|---|
| 128987 | 6/1947 | Australia | 285/310 |
| 137083 | 11/1933 | Austria | 215/284 |
| 1392611 | 2/1965 | France | 215/284 |
| 606783 | 7/1960 | Italy | 215/284 |

*Primary Examiner*—Joseph J. Rolla
*Assistant Examiner*—Frederick R. Handren
*Attorney, Agent, or Firm*—Cushman, Darby & Cushman

[57] ABSTRACT

A device for securing a dosing apparatus on a bottle, in order to ensure that the dosing apparatus is not unobservedly removed from the bottle, includes a plurality of securing members, each of which is hingedly mounted on the dosing apparatus. Each securing member cooperates with a substantially radial abutment surface on the bottleneck in such a manner that while pressing the end opposite the hinge against the bottleneck, the securing member presses the dosing apparatus sealingly against the opening of the bottle while cooperating in a lever-like manner with the abutment surface on the bottle. In this position the securing members are secured on the bottle by a sealing strip received in recesses on the end opposite the hinge and on the side of each securing member facing away from the bottleneck in the mounted state.

2 Claims, 4 Drawing Figures

DEVICE FOR SECURING A DOSING APPARATUS ON A BOTTLE

FIELD OF THE INVENTION

The invention relates to a device for securing a dosing apparatus on a bottle.

BACKGROUND ART

Dosing apparatuses to be secured on bottles are known. These dosing apparatuses are adapted to dispense predetermined quantities of a beverage and are usually secured to the bottle by means of tape or the like strips coated with an adhesive. This way of securing does not, however, provide a particularly high guarantee that the user does not unobservedly remove the dosing apparatus temporarily so as to pour an unregistered drink.

SUMMARY OF THE INVENTION

It is accordingly an object of the invention to provide a device for securing a dosing apparatus on a bottle, whereby the device provides the owner of the bottle, preferably the owner of a bar or a restaurant, with a guarantee that the dosing apparatus is not temporarily removed before the bottle is empty.

In satisfaction of the foregoing object and advantages there is provided by the present invention a device comprising a plurality of securing means, each securing means being hingedly mounted on the dosing apparatus and cooperating with a substantially radially extending, axially facing abutment surface on the bottleneck in such a manner that when the end opposite the hinge is pressed against the bottleneck, said securing means presses the dosing apparatus sealingly against the opening of the bottle while cooperating with the abutment surface on the bottle in a lever-like manner, said device further comprising a sealing strip positioned about the ends opposite the hinge of the securing means so as to tighten the securing means against the bottleneck.

In this manner a device is provided which ensures that the dosing apparatus cannot be unobservedly removed as the correct positioning thereof on the bottle prevents it from being removed from the bottle without the sealing strip being cut or broken in another manner. The sealing strip ensures that the device cannot be removed without said strip being cut over or broken in another manner. Consequently, the owner of a bar or a restaurant can be quite certain that the dosing apparatus remains on the bottle until the bottle is completely empty. If desired, the dosing apparatus can follow the bottle from the first filling to a refilling, whereby for instance the company filling the bottles can provide the device with particularly marked sealing strips. Such devices are particularly suited when the dosing apparatuses are used together with activating systems automatically registering the number and the amount of dispensed drinks.

Each hinge may according to the invention be displaceably positioned on the dosing apparatus in such a manner that the dosing apparatus is adjustable to different types of bottles as the abutment surface is present in the form of an upper defining surface in a circumferential groove at the opening of most known bottles for beverages, preferably in the form of liquor.

In addition each hinge may according to the invention be a substantially rectangular, strong metal wire, one side of which is pivotably received in a recess in the side of the dosing apparatus, and the opposite side of which is pivotably mounted in a hole in the securing means. As a result, a particularly simple embodiment of the device according to the invention is obtained.

Finally according to the invention, the recess in the side of the dosing apparatus may be one of many recesses, preferably two, situated in a row when seen in the longitudinal direction of the dosing apparatus, a row being present for each securing means. In this manner the displaceable positioning of the hinge is obtained in a simple manner.

BRIEF DESCRIPTION OF DRAWING

The invention will be described below with reference to the accompanying drawing, in which.

DESCRIPTION OF PREFERRED EMBODIMENTS

Figure 1:
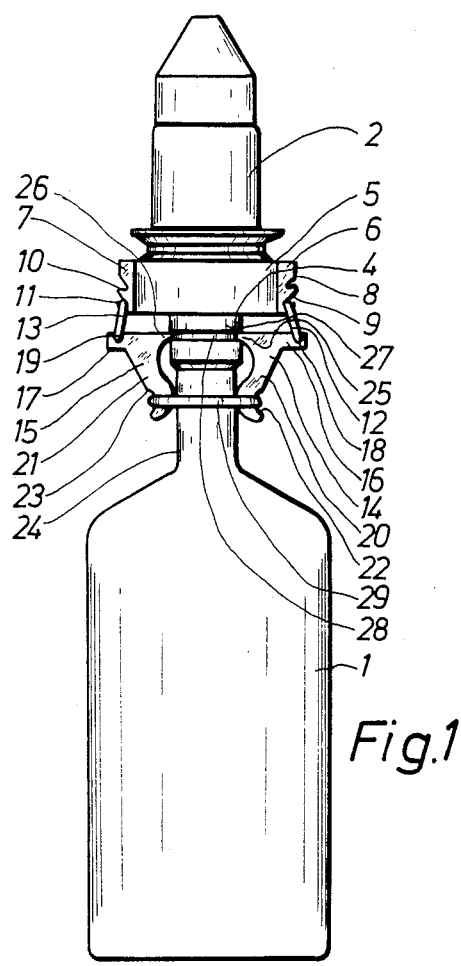
FIG. 1 illustrates a bottle provided with a dosing apparatus secured by means of a device according to the invention.

FIG. 1 illustrates a bottle 1 provided with a dosing apparatus 2 for dispensing predetermined quantities of the beverage contained in the bottle. The dosing apparatus is of the type described in U.S. patent application Ser. No. 629,540 filed July 10, 1984, now U.S. Pat. No. 4,598,845. Downwardly, i.e. at the end receiving the opening 4 of the bottle, this dosing apparatus comprises a mounting portion 5 with diametrically opposing, protruding projections 6, 7 extending along the mounting portion 5 in the axial direction thereof. These projections 6, 7 comprise individually two recesses 8, 9 and 10, 11, respectively, extending from the radial, outer surfaces of the projections 6, 7 and inclining downwardly towards the end of the dosing apparatus 2 receiving the opening 4 of the bottle 1. A rectangular hinge 12, 13 is situated in the lowermost recesses, 9, 11 of FIG. 1 and is made of a strong metal wire. A securing means 14, 15 is mounted at the end of the rectangular hinge 12, 13 opposite the end in engagement with the projection, 6, 7 on the dosing apparatus 2. In the embodiment of FIG. 1, these securing means are L-shaped with a short leg 16 and 17, respectively. At the outer end these legs comprise a hole 18 and 19, respectively, receiving the hinge 12 and 13, respectively. The L-shaped securing means further comprise a long leg 20 and 21, respectively, the outer end of which comprises a recess 22 and 23, respectively. These recesses are positioned on the side of the long leg facing away from the bottleneck 24 when the device with the dosing apparatus is mounted on the bottle 1. The L-shaped securing means 14 and 15, respectively, further comprises a heel 25 and 26, respectively, cooperating with an abutment surface 27 on the bottle. Usually this abutment surface is formed by the upper, radially extending, axially facing surface in a circumferential groove 28 immediately adjacent the opening of the bottle on most bottles for liquor.

The two projections 6, 7 of the dosing apparatus with associated recesses 8, 9, 10, and 11 and the hinges 12, 13 as well as the securing means 14, 15 associated therewith are shaped and dimensioned in such a manner that the dosing apparatus 2 is sealingly pressed against the opening 4 of the bottle provided the heels 25, 26 of the securing means 14, 15 are guided into engagement with the abutment surface 27 in question on the bottle and provided the long legs of the securing means are subsequently pressed radially against the bottleneck 24.

When the long legs of the securing means 14, 15 are pressed against the bottleneck 24, a sealing strip 29 is tightly situated about the long legs 20, 21 of the securing means 14, 15, said sealing strip 29 being situated in the recesses 22, 23, which prevents the strip from being displaced in axial direction relative to the bottle 1 and the dosing apparatus 2.

The securing device of the dosing apparatus 2 thus comprises both the hingedly mounted securing means 14, 15 and the sealing strip 29.

Figure 2:
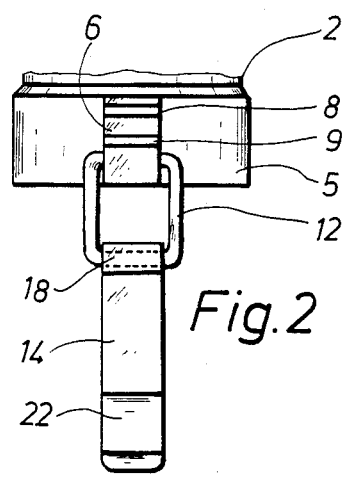
FIG. 2 is a front view, from the right in FIG. 1, of a securing means associated with the device according to the invention and shown together with the lowermost portion of a dosing apparatus.

FIG. 2 is a front view on a larger scale of the securing means 14 without the bottle.

The recesses 8, 9 and 10, 11, respectively, in the projections 6, 7 on the dosing apparatus 2 are suitably dimensioned in such a manner that the rectangular hinge 12 during the mounting therein must be pressed into the bottom of the recesses in order to prevent the hinge 12, 13 from unintendedly falling out of the recesses again. At the bottom, the recesses may be enlarged in such a manner that the hinge 12 can easily be turned about an axis extending along the side of the hinge 12, 13 received in said recess 8, 9, 10 or 11.

Correspondingly, the hole 18, 19 may be shaped with such an internal diameter that the hinge 12, 13 is easily turned about an axis extending along the side of the hinge 12, 13 received therein.

Figure 3:
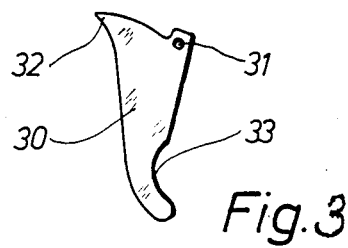
FIG. 3 illustrates a second embodiment of a securing means to be used in a securing device according to the invention.

FIG. 3 illustrates a second embodiment of a securing means 30. This securing means is almost boot-shaped as a hole 31 receiving a rectangular hinge 12, 13 is shaped in the heel of the boot, whereas the toe 32 of the boot cooperates with the abutment surface 27 on the bottle 1. On the heelside, the bootleg is provided with a recess 33 corresponding to the recesses 22 and 23 on the embodiment of FIGS. 1 and 2 for the securing means 14, 15 of the securing device.

Figure 4:
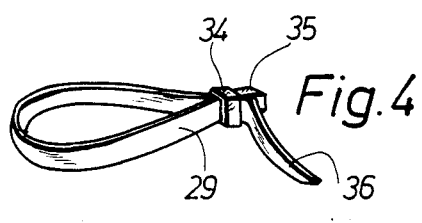
FIG. 4 is a perspective view of a sealing strip.

FIG. 4 is a perspective view of a sealing strip 29. This sealing strip is of a generally known type, i.e. plastic cable binders. The sealing strip shown comprises a thin plastic strip extending through a rectangular locking means 34. One end of the strip comprises an enlarged portion 35 preventing the end in question from being pulled through the locking means 34, whereas the opposite end 36 may go in and out of the locking means 34 until it is tightly mounted, e.g. in connection with the securing means 14, 15 or 30 in the device according to the invention. During the latter mounting, the enlarged portion 35 of the strip is pulled into the locking means, and the strip ends are interlocked in the locking means 34 through the wedging effect and a toothing shaped on the bearing sides of the strip. As a result the strip can only be removed from the tightened position by being cut over or broken in another manner.

The invention has been described in connection with preferred embodiments. Many modifications may, of course, be carried out without thereby deviating from the scope of the invention. Other types of sealing strips may for instance be used, and the securing means may be of many different shapes provided they can cooperate with the abutment surface 27 during the tightening in a lever-like manner. The securing means 14, 15 or 30 are suitably shaped of a plastic material providing them with a suitable strength. They may for instance be made of the same material as the outer housing of the dosing apparatus. The projections 6, 7 with the associated recesses 8, 9, 10, and 11 on the mounting portion 5 of the dosing apparatus are suitably cast integral with the dosing apparatus and are therefore of the same material as said apparatus.

I claim:

1. A dosing apparatus for dispensing a predetermined amount of liquid and a device for securing the dosing apparatus on a bottle, the securing device comprising a plurality of lever-like securing means, each securing means having an end mounted on the dosing apparatus by a hinge which includes a strong metal wire formed into a substantially rectangular shape, one end of which hinge is pivotably received in a recess in the side of the dosing apparatus, and the opposite end of which is pivotably mounted in a hole in said one end of the respective securing means, the recess in the side of the dosing apparatus being one of a plurality of recesses situated in a row when seen in the longitudinal direction of the dosing apparatus, a row being present for each securing means, said one end of each securing means, at a location radially inward of said hole, being cooperable with a substantially radial abutment surface on the bottleneck below the opening therein in such a manner that when the end of the respective securing means opposite said one end is pressed radially inward in a lever-like manner against the bottleneck said securing means pulls the dosing apparatus sealingly against the opening of the bottle while cooperating with the abutment surface on the bottle, the securing device further including a sealing strip positioned about said opposite ends of the securing means for tightening the securing means against the bottleneck.

2. A dosing apparatus and securing device as in claim 1 wherein each of said opposite ends of the securing means has a recess therein facing radially outward and wherein said sealing strip is positioned in said recess.

* * * * *